United States Patent

Dansui et al.

[11] Patent Number: 6,074,785
[45] Date of Patent: Jun. 13, 2000

[54] NICKEL/METAL HYDRIDE STORAGE BATTERY

[75] Inventors: Yoshitaka Dansui, Fujisawa; Fumio Kato; Kenji Suzuki, both of Kamakura; Kohji Yuasa, Chigasaki, all of Japan

[73] Assignee: Matsushita Electric Industrial Co., Ltd., Osaka, Japan

[21] Appl. No.: 09/058,227

[22] Filed: Apr. 10, 1998

[30] Foreign Application Priority Data

Apr. 14, 1997 [JP] Japan ................................. 9-095480
Apr. 14, 1997 [JP] Japan ................................. 9-095481
Apr. 14, 1997 [JP] Japan ................................. 9-095482
Apr. 14, 1997 [JP] Japan ................................. 9-095483

[51] Int. Cl.$^7$ ........................................ H01M 4/32
[52] U.S. Cl. .................................. 429/223; 429/224
[58] Field of Search ................................ 429/223, 224

[56] References Cited

U.S. PATENT DOCUMENTS

| 4,251,603 | 2/1981 | Matsumoto et al. | 429/94 |
| 5,348,822 | 9/1994 | Ovshinsky et al. | 429/223 |
| 5,366,831 | 11/1994 | Watada et al. | 429/223 |
| 5,707,764 | 1/1998 | Miyamoto et al. | 429/223 |
| 5,773,169 | 6/1998 | Matsuda et al. | 429/223 |

FOREIGN PATENT DOCUMENTS 08236110  9/1996  Japan .

*Primary Examiner*—Ngoclan Mai
*Attorney, Agent, or Firm*—Stevens, Davis, Miller & Mosher, L.L.P.

[57] ABSTRACT

The present invention provides a nickel/metal hydride storage battery using improved nickel hydroxide with an increased energy density as the active material. This invention is characterized in that the nickel hydroxide as the active material of the positive electrode constituting the battery indispensably contains as a solid solution at least one transition metal selected from the group consisting of Mn, Cr and Co in a proportion of 2 to 20 atomic % based on the amount of the nickel hydroxide in terms of metallic nickel, and that the crystal structure of the nickel hydroxide at charged state is a hexagonal or tetragonal system which has a diffraction peak of $2\theta$ on (00l) plane of $\beta$-NiOOH at an angle of approximately 15° to 19° in X-ray diffraction using CuK$\alpha$ as a source and has a regular array with a NaCl type structure.

10 Claims, 1 Drawing Sheet

NICKEL/METAL HYDRIDE STORAGE BATTERY

BACKGROUND OF THE INVENTION

1. Field of the Invention

The present invention relates to a nickel/metal hydride storage battery which uses an improved nickel active material for positive electrode having an increased energy density and possesses improved characteristics of the positive electrode and hence improved characteristics of the battery. In detail, in the present invention, nickel hydroxide as the active material of the positive electrode is essentially subjected to reduction and oxidation, i.e., discharge and charge reactions, while essentially assuming β-phase. In further detail, the discharge and charge reactions of nickel hydroxide are carried out at an average valence (average oxidation valence) of nickel of less than 3.5 and not less than 2.1.

2. Description of the Related Art

In recent years, alkaline storage batteries have been desired to be increased in capacity, with the spread of portable electric devices. In particular, nickel/metal hydride storage batteries are secondary batteries comprising a positive electrode made of an active material composed mainly of nickel hydroxide and a negative electrode composed mainly of a hydrogen-absorbing alloy, and are being rapidly spread as secondary batteries having high capacity and reliability.

Positive electrodes for alkaline storage batteries are roughly classified into sintered type and non-sintered type. The sintered type positive electrodes are produced by preparing a porous nickel sintered plaque with a porosity of about 80% by sintering nickel powder, impregnating the porous nickel sintered plaque with a nickel salt solution such as an aqueous nickel nitrate solution, and then forming a nickel hydroxide active material in the porous nickel sintered substrate, for example, by immersion in an aqueous alkali solution. The increase of the capacity of such electrodes is limited because the porosity of the plaque is difficult to increase further, so that the amount of the active material incorporated cannot be increased.

An example of the non-sintered type positive electrodes is the electrode disclosed in U.S. Pat. No. 4,251,603 which is produced by filling nickel hydroxide as an active material in the pores of a sponge-like porous plaque with a porosity of more than 95% made of a nickel metal having a multiplicity of cells connected with each other three-dimensionally. This electrode is widely used at present as the positive electrode of an alkaline storage battery having a high capacity.

As to this non-sintered type positive electrode, it has been proposed that spherical nickel particles be filled in the pores of the sponge-like nickel porous plaque in order to increase the capacity. In this case, the pore size of the sponge-like nickel porous plaque is approximately 200–500 μm and spherical nickel particles with a diameter of several micrometers to several ten micrometers are filled in the pores. When such a structure is employed, the charge and discharge reactions of nickel hydroxide particles near the skeleton of the nickel porous plaque proceed smoothly because the particles retain electroconductivity, but those of nickel hydroxide particles apart from the skeleton do not proceed sufficiently.

Therefore, in the non-sintered type positive electrode, an electroconductive agent is used in addition to the nickel hydroxide active material in order to increase the utilization of the nickel hydroxide filled, whereby spherical nickel hydroxide particles are electrically connected to form an electroconductive network. As the electroconductive agent, there are used cobalt compounds (e.g. cobalt hydroxide and cobalt monooxide), metallic cobalt, metallic nickel, etc. Thus, it becomes possible to maintain the electroconductivity in the non-sintered type positive electrode even if the active material is impregnated into the porous plaque at a high density, and hence the capacity can be increased.

U.S. Pat. No. 5,348,822 and the like disclose the improvement of nickel hydroxide itself as an active material for the purpose of increasing the capacity.

Nickel hydroxide which has heretofore generally been known and are used as the active material of the non-sintered type positive electrode is one which is called active nickel hydroxide ($\beta$-Ni(OH)$_2$) at discharged state. The average valence of the nickel is about 2.1. This active material becomes β-type nickel oxyhydroxide (β-NiOOH) at charged state. In this case, the average valence of the nickel is said to be around 3.1.

Therefore, when charge and discharge are carried out, the utilization of nickel hydroxide becomes 100% in substantially one-electron reactions. The utilization is the percentage of an actually measured capacity value based on a theoretical capacity value per unit weight 289 mAh/g calculated by assuming the occurrence of the one-electron reactions. Consequently, when said active material is used, the energy density of the positive electrode becomes about 650 mAh/cc.

It was also confirmed that when a nickel/metal hydride storage battery is continuously overcharged at a low temperature, the valence of nickel of the positive electrode is further increased to 3.67.

However, when the average nickel valence exceeds about 3.5, nickel hydroxide becomes γ-type nickel oxyhydroxide (γ-NiOOH). γ-NiOOH is a substance having a diffraction peak on (003) plane at an angle of diffraction 2θ of about 12° (λ=1.5405) in X-ray diffraction using CuKα as a source. Since this substance has cations, anions, water, etc., which are inserted between nickel-nickel metal faces, its crystals are more easily expanded than those of β-NiOOH (density: 4.68 g/cm$^3$).

In addition, γ-NiOOH (density: 3.79 g/cm$^3$) becomes α–3Ni(OH)$_2$.2H$_2$O (density: 2.82 g/cm$^3$) upon discharge. The density change in this case is remarkable, so that the active material repeats its expansion and shrinkage. Therefore, spherical nickel hydroxide particles lose the spherical shape.

Moreover, when γ-NiOOH at charged state is accumulated without discharge, the positive electrode is swollen and absorbs an electrolyte in the battery. Consequently, the volume of the electrolyte held by a spacer is decreased, so that the spacer lacks the electrolyte. Therefore, the internal resistance of the battery is increased to make discharge impossible.

These phenomena have been known since early times also in the case of using a sintered type positive electrode. In particular, a sealed battery is deteriorated in battery characteristics by swelling of the positive electrode.

SUMMARY OF THE INVENTION

The present invention solves the problems described above and is mainly intended to provide a nickel/metal hydride storage battery excellent in performance characteristics by improving nickel hydroxide itself as an active material for the positive electrode to increase the energy density of the active material and hence characteristics of the positive electrode.

For achieving the above object, the nickel hydroxide as the main active material of the positive electrode used in the present invention contains as a solid solution at least one transition metal selected from the group consisting of Mn, Cr and Co, in a proportion of 2 to 20 atomic % based on the amount of the nickel hydroxide in terms of metallic nickel, and the crystal structure of the nickel hydroxide at charged state is a hexagonal or tetragonal system which has a diffraction peak of 2θ on (00l) plane of β-NiOOH at an angle of approximately 15°–19° in X-ray diffraction using CuKα as a source and has a regular array with a NaCl type structure.

In addition, the nickel hydroxide as the main active material of the positive electrode used in the present invention contains as a solid solution at least one transition metal selected from the group consisting of Mn, Cr and Co and at least one alkali metal selected from the group consisting of Li, Na, K, Rb and Cs, the proportion of the transition metal(s) being 2 to 20 atomic % based on the amount of the nickel hydroxide in terms of metallic nickel, and the proportion of the alkali metal(s) being 5 to 10 atomic % based on the amount of the nickel hydroxide in terms of metallic nickel, and the crystal structure of the nickel hydroxide at charged state is a hexagonal or tetragonal system which has a diffraction peak of 2θ on (00l) plane of β-NiOOH at an angle of approximately 15°–19° in X-ray diffraction using CuKα as a source and has a regular array with a NaCl type structure.

Further, the nickel hydroxide as the main active material of the positive electrode used in the present invention contains as a solid solution at least one transition metal selected from the group consisting of Mn, Cr and Co and at least one alkaline earth metal selected from the group consisting of Mg, Ca, Sr and Ba, the proportion of the transition metal(s) being 2 to 20 atomic % based on the amount of the nickel hydroxide in terms of metallic nickel, and the proportion of the alkaline earth metal(s) being 5 to 10 atomic % based on the amount of the nickel hydroxide in terms of metallic nickel, and the crystal structure of the nickel hydroxide at charged state is a hexagonal or tetragonal system which has a diffraction peak of 2θ (00l) plane of β-NiOOH at an angle of approximately 15°–19° in X-ray diffraction using CuKα as a source and has a regular array with a NaCl type structure.

Still further, the nickel hydroxide as the main active material of the positive electrode used in the present invention contains as a solid solution at least one transition metal selected from the group consisting of Mn, Cr and Co, at least one alkali metal selected from the group consisting of Li, Na, K, Rb and Cs, and at least one alkaline earth metal selected from the group consisting of Mg, Ca, Sr and Ba, the proportion of the transition metal(s) being 2 to 20 atomic % based on the amount of the nickel hydroxide in terms of metallic nickel, and the total proportion of the alkali metal(s) and the alkaline earth metal(s) being 5 to 10 atomic % based on the amount of the nickel hydroxide in terms of metallic nickel, and the crystal structure of the nickel hydroxide at charged state is a hexagonal or tetragonal system which has a diffraction peak of 2θ on (00l) plane of β-NiOOH at an angle of approximately 15°–19° in X-ray diffraction using CuKα as a source and has a regular array with a NaCl type structure.

DETAILED DESCRIPTION OF THE INVENTION

Figure 1:
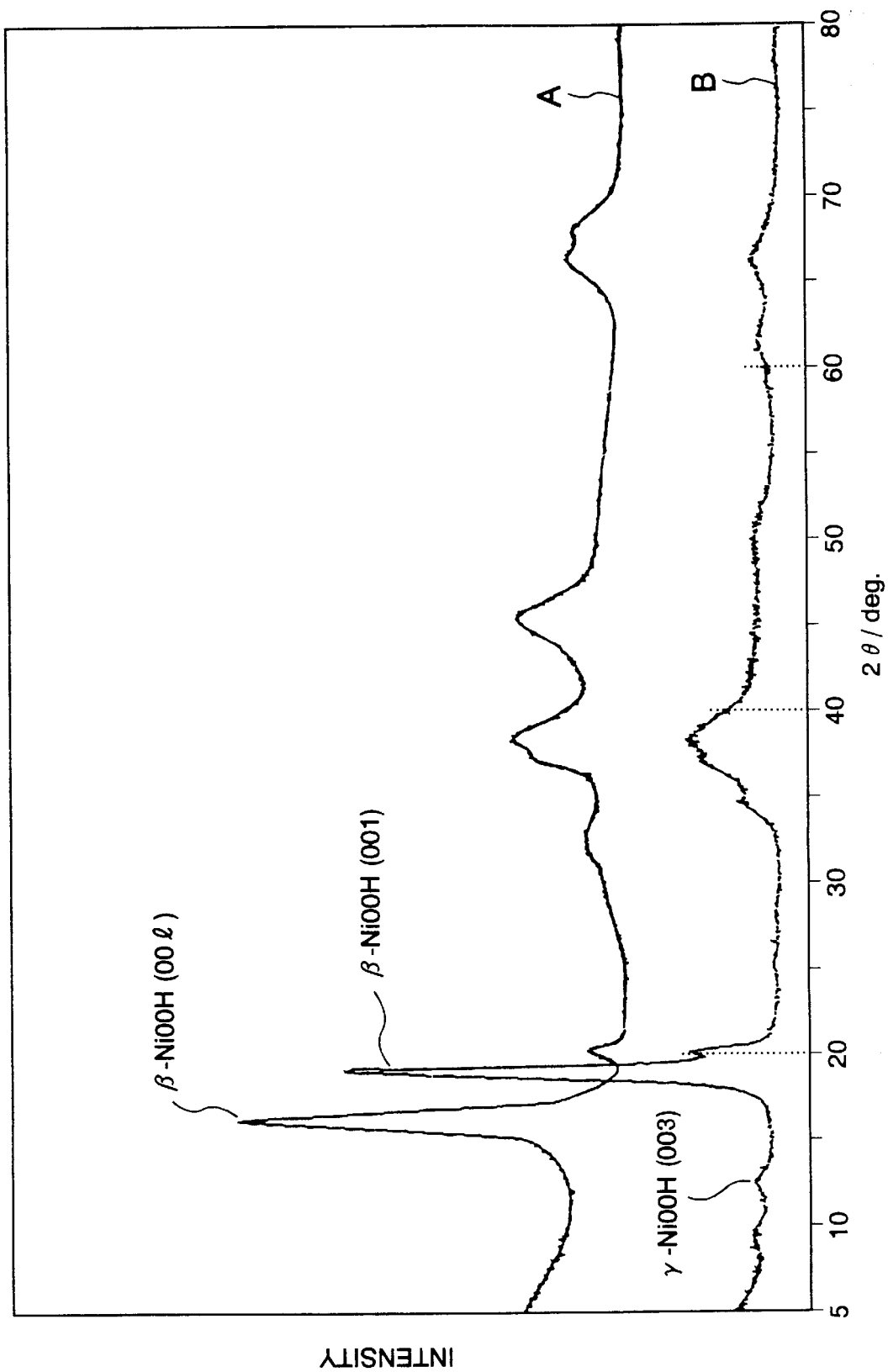
FIG. 1 is a graph of X-ray diffraction curves showing the relationship between angle of diffraction 2θ and peak intensity.

As described in claim 1, one aspect of the present invention is directed to a nickel/metal hydride storage battery comprising a positive electrode made of an active material composed mainly of nickel hydroxide, a negative electrode composed mainly of a hydrogen-absorbing alloy, an alkali electrolyte and a separator, wherein the nickel hydroxide as the main active material of said positive electrode contains as a solid solution at least one transition metal selected from the group consisting of Mn, Cr and Co, in a proportion of 2 to 20 atomic % based on the amount of the nickel hydroxide in terms of metallic nickel, and the crystal structure of the nickel hydroxide at charged state is a hexagonal or tetragonal system which has a diffraction peak of 2θ on (00l) plane of β-NiOOH at an angle of approximately 15°–19° in X-ray diffraction using CuKα as a source and has a regular array with a NaCl type structure. According to the present invention, the active material of the positive electrode which is composed of the nickel hydroxide has the crystal structure described above and becomes a β-phase hyperoxide called β-NiOOH in which the average nickel valence at charged state is as high as near 3.5 though less than 3.5, the number of reaction electrons is increased, the energy density of the active material is increased, and characteristics of the positive electrode can be improved.

When at least one transition metal selected from the group consisting of Mn, Cr and Co is incorporated as a solid solution into nickel hydroxide, the crystal structure of the nickel hydroxide at charged state is a hexagonal or tetragonal system which has a diffraction peak of 2θ on (00l) plane of β-NiOOH at an angle of approximately 16°–19° in X-ray diffraction using CuKα as a source and has a regular array with a NaCl type structure.

The proportion of the transition metal(s) incorporated as a solid solution is suitably 2 to 20 atomic % based on the amount of the nickel hydroxide in terms of metallic nickel. If the proportion is less than 2 atomic %, the above-mentioned diffraction peak cannot be obtained because the proportion is not sufficient. If the proportion of the transition metal(s) is too high, the proportion of nickel hydroxide itself as an active material is decreased as much, so that the proportion of the active material incorporated into the positive electrode is decreased, resulting in a decreased capacity of the positive electrode.

As described in claim 4, another aspect of the present invention is directed to a nickel/metal hydride storage battery comprising a positive electrode made of an active material composed mainly of nickel hydroxide, a negative electrode composed mainly of a hydrogen-absorbing alloy, an alkali electrolyte and a separator, wherein the nickel hydroxide as the main active material of said positive electrode contains as a solid solution at least one transition metal selected from the group consisting of Mn, Cr and Co and at least one alkali metal selected from the group consisting of Li, Na, K, Rb and Cs, the proportion of the transition metal(s) being 2 to 20 atomic % based on the amount of the nickel hydroxide in terms of metallic nickel, and the proportion of the alkali metal(s) being 5 to 10 atomic % based on the amount of the nickel hydroxide in terms of metallic nickel, and the crystal structure of the nickel hydroxide at charged state is a hexagonal or tetragonal system which has a diffraction peak of 2θ on (00l) plane of β-NiOOH at an angle of approximately 15°–19° in X-ray diffraction using CuKα as a source and has a regular array with a NaCl type structure.

As described in claim 7, further another aspect of the present invention is directed to a nickel/metal hydride storage battery comprising a positive electrode made of an active material composed mainly of nickel hydroxide, a negative electrode composed mainly of a hydrogen-absorbing alloy, an alkali electrolyte and a separator, wherein the nickel hydroxide as the main active material of said positive electrode contains as a solid solution at least one transition metal selected from the group consisting of Mn, Cr and Co and at least one alkaline earth metal selected from the group consisting of Mg, Ca, Sr and Ba, the proportion of the transition metal(s) being 2 to 20 atomic % based on the amount of the nickel hydroxide in terms of metallic nickel, and the proportion of the alkaline earth metal(s) being 5 to 10 atomic % based on the amount of the nickel hydroxide in terms of metallic nickel, and the crystal structure of the nickel hydroxide at charged state is a hexagonal or tetragonal system which has a diffraction peak of $2\theta$ on (00l) plane of $\beta$-NiOOH at an angle of approximately 15°–19° in X-ray diffraction using CuK$\alpha$ as a source and has a regular array with a NaCl type structure.

As described in claim 10, still another aspect of the present invention is directed to a nickel/metal hydride storage battery comprising a positive electrode made of an active material composed mainly of nickel hydroxide, a negative electrode composed mainly of a hydrogen-absorbing alloy, an alkali electrolyte and a separator, wherein the nickel hydroxide as the main active material of said positive electrode contains as a solid solution at least one transition metal selected from the group consisting of Mn, Cr and Co, at least one alkali metal selected from the group consisting of Li, Na, K, Rb and Cs, and at least one alkaline earth metal selected from the group consisting of Mg, Ca, Sr and Ba, the proportion of the transition metal(s) being 2 to 20 atomic % based on the amount of the nickel hydroxide in terms of metallic nickel, and the total proportion of the alkali metal(s) and the alkaline earth metal(s) being 5 to 10 atomic % based on the amount of the nickel hydroxide in terms of metallic nickel, and the crystal structure of the nickel hydroxide at charged state is a hexagonal or tetragonal system which has a diffraction peak of $2\theta$ on (00l) plane of $\beta$-NiOOH at an angle of diffraction $2\theta$ of approximately 15°–19° in X-ray diffraction using CuK$\alpha$ as a source and has a regular array with a NaCl type structure.

The present invention is explained in detail with the following examples.

EXAMPLE 1

A positive electrode plate was prepared in the following manner. 0.5 Parts by weight of a polytetrafluoroethylene as a binder, 10 parts by weight of cobalt hydroxide as an electroconductive agent and a proper amount of water as a dispersion medium were added to 100 parts by weight of a material obtained by incorporating Mn as a solid solution into nickel hydroxide powder of spherical particles with an average diameter of 15 $\mu$m used as an active material, in a proportion of 18 atomic % based on the amount of the nickel hydroxide in terms of metallic nickel, to obtain paste. The paste was filled in pores of a sponge-like nickel porous plaque and dried, followed by rolling with a roller press. The dimensions of the positive electrode plate were adjusted as follows: width 35 mm, length 120 mm and thickness 0.78 mm. The theoretical capacity of the positive electrode (calculated by taking the theoretical capacity of nickel hydroxide per unit weight as 289 mAh/g on the assumption that nickel hydroxide undergoes one-electron reaction) was 1,600 mAh.

A negative electrode plate was prepared by adding 1 part by weight of carbon powder, 1 part by weight of a polytetrafluoroethylene and a proper amount of water to 100 parts by weight of AB$_5$ type hydrogen-absorbing alloy powder to obtain paste, and applying the paste on a punched metal, followed by drying and rolling. The dimensions of the negative electrode plate were adjusted as follows: width 35 mm, length 145 mm and thickness 0.39 mm. The theoretical capacity of the negative electrode (calculated by taking the theoretical electrical quantity of the hydrogen-absorbing alloy per unit weight as 280 mAh/g) was 2,900 mAh.

A separator made of polypropylene nonwoven fabric was held between the positive and negative electrode plates prepared above, and the whole of the resulting assembly was spirally wound to form a group of the plates, which were inserted into a battery case. A predetermined volume of an aqueous sodium hydroxide solution having a concentration of 10 mol/l was poured as an alkali electrolyte into the battery case, after which the battery case was sealed with a sheet capable of serving for a positive terminal, too. Thus, a nickel/metal hydride storage battery A of 4/5 A size having a nominal capacity of 1,600 mAh was produced.

COMPARATIVE EXAMPLE

As a battery B of Comparative Example, there was used a battery having the same structure as above except that nickel hydroxide containing no Mn as a solid solution was used in place of the active material for positive electrode plate prepared above.

Each of the batteries A and B was subjected twice to charge/discharge cycling consisting of charge at 160 mA for 15 hours, standing for 1 hour and discharge at 320 mA to a terminal voltage of 1 V.

Then, aging was carried out by standing for 3 days in an atmosphere of 45° C., followed by charge for 18 hours at a current of 160 mA in an atmosphere of 20° C., standing for 1 hour and discharge at 320 mA to a terminal voltage of 1 V. From the discharge capacity in this case, the utilization of the active material of the positive electrode (the percentage of the actual discharge capacity based on the theoretical capacity of the positive electrode 289 mAh) was calculated to be 130% for the battery A and 100% for the battery B.

For confirmation, each of the batteries A and B in charged state was disassembled, and the positive electrode plate was taken out and then analyzed by X-ray diffraction using CuK$\alpha$ as a source (wavelength $\lambda$: 1.5405). The angle of diffraction $2\theta$ was measured by the analysis. As a result, in the case of the positive electrode plate of the battery A, a diffraction peak of $2\theta$ on (00l) plane of $\beta$-NiOOH could be confirmed at an angle of near 16° (15.9°) as shown in FIG. 1. In the case of the positive electrode plate of the battery B, no peak was observed at an angle of near 16° but there were observed a small peak on (003) plane of $\gamma$-NiOOH near 12° and a peak on (001) plane of $\beta$-NiOOH near 19°(19.3°).

This fact indicates that in the battery B of Comparative Example, the active material of the positive electrode became $\beta$-NiOOH and partly $\gamma$-NiOOH at charged state. According to the chemical analysis, the average valence of nickel of the active material was 3.1. Based on the analytic result, the reaction was carried out the average valance of between 3.1 and 2.1, hence the utilization of the active material of the positive electrode was 100%.

In the case of the battery A of Example 1, the following is conjectured. At charged state, the active material of the positive electrode assumed a state in which nickel had been highly oxidized, the nickel average valence was increased to about 3.5 though less than 3.5 since no peak due to γ-NiOOH could be confirmed. The number of reaction electrons became larger than in the battery B, the energy density of the nickel hydroxide itself was increased, and hence the utilization of the active material of the positive electrode became 130% which was 30% higher than in the battery B. In addition, namely, no γ-NiOOH was formed.

Although in Example 1, there was used the material obtained by incorporating Mn as a solid solution into the nickel hydroxide active material for the positive electrode in a proportion of 18 atomic % based on the amount of the nickel hydroxide in terms of metallic nickel, substantially the same effect as above could be obtained so long as the proportion of Mn was 2 to 20 atomic %. The most preferable range of the proportion of Mn was 8 to 20 atomic %.

In addition, although Mn was used as a metal to be incorporated as a solid solution into the nickel hydroxide active material for the positive electrode, substantially the same effect as in Example 1 could be obtained also by using either Cr or co in place of Mn as a transition metal. In this case, the proportion of Cr or Co incorporated as a solid solution was preferably 5 to 20 atomic % or 15 to 20 atomic %, respectively, based on the amount of the nickel hydroxide active material in terms of metallic nickel.

Further, substantially the same effect as in Example 1 can be obtained not only by using, as described above, Mn, Cr or Co alone as a metal to be incorporated as a solid solution into the nickel hydroxide active material for the positive electrode, but also by using either a combination of Mn and Cr or a combination of Mn and Co. When either of the combinations is used, the proportions of the metals incorporated are preferably as follows: the proportions of Mn and Cr are 5 to 20 atomic % and 5 to 10 atomic %, respectively, based on the amount of the nickel hydroxide in terms of metallic nickel, or the proportions of Mn and Co are 5 to 20 atomic % and 2 to 5 atomic %, respectively, based on the amount of the nickel hydroxide in terms of metallic nickel.

Although there is described above the case where a combination of Mn as a main metal and Cr or Co is used as metals to be incorporated as a solid solution into the nickel hydroxide, employment of a combination of Cr or Co as a main metal and Mn brings about substantially the same effect as in Example 1. It is also possible to use the three metals Mn, Cr and Co in combination. When two or three of the metals are used in combination, the total proportion of the two or three metals incorporated as a solid solution into the nickel hydroxide is preferably 7 to 30 atomic % based on the amount of the nickel hydroxide active material in terms of metallic nickel.

Although an aqueous sodium hydroxide solution having a concentration of 10 mol/l was used above as the alkali electrolyte, the concentration is not limited to 10 mol/l and ranges preferably from 8 to 12 mol/l.

Although the aqueous solution of sodium hydroxide alone was used above as the alkali electrolyte, the alkali electrolyte is not limited thereto and substantially the same effect as in Example 1 could be obtained also by using, for example, any of an aqueous solution of potassium hydroxide alone, a mixed aqueous solution of sodium hydroxide and potassium hydroxide, and a mixed aqueous solution of at least one member selected from the group consisting of sodium hydroxide and potassium hydroxide and at least one member selected from the group consisting of lithium hydroxide, rubidium hydroxide and cesium hydroxide.

EXAMPLE 2

A nickel/metal hydride storage battery C was produced in the same manner as in Example 1 except that as an active material for positive electrode plate, there was used 100 parts by weight of a material obtained by incorporating Mn and Na as a solid solution into nickel hydroxide powder of spherical particles with an average diameter of 15 μm in proportions of 18 atomic % and 8 atomic %, respectively, based on the amount of the nickel hydroxide in terms of metallic nickel.

For comparison, the same battery B as in Comparative Example was used.

For each of the batteries C and B, the utilization of the active material was determined in the same manner as in Example 1 and found to be 135% for the battery C and 100% for the battery B.

For confirmation, in the same manner as in Example 1, each of the batteries C and B in charged state was disassembled, and the positive electrode plate was taken out and then analyzed by X-ray diffraction. The angle of diffraction 2θ was measured by the analysis. As a result, in the case of the positive electrode plate of the battery C, a diffraction peak of 2θ on (001) plane of β-NiOOH could be confirmed at an angle of near 17° and no peak due to γ-NiOOH could be confirmed. The diffraction peaks in the case of the positive electrode plate of the battery B were as described above.

In the case of the battery C, the following is conjectured: at charged state, the active material of the positive electrode assumed a state in which nickel had been highly oxidized, the nickel average valence was increased to about 3.5 though less than 3.5, the number of reaction electrons became larger than in the battery B, the energy density of the nickel hydroxide itself was increased, and hence the utilization of the active material of the positive electrode became 135% which was 35% higher than in the battery B.

Although in Example 2, there was used the material obtained by incorporating Mn and Na as a solid solution into the nickel hydroxide active material for the positive electrode in proportions of 18 atomic % and 8 atomic %, respectively, based on the amount of the nickel hydroxide in terms of metallic nickel, substantially the same effect as above could be obtained so long as the proportions of Mn and Na are 2 to 20 atomic % and 5 to 10 atomic %, respectively. Preferable ranges of the proportions of Mn and Na were 5 to 20 atomic % and 5 to 10 atomic %, respectively.

In addition, although in Example 2, the transition metal Mn and the alkali metal Na were used as metals to be incorporated as a solid solution into the nickel hydroxide active material for the positive electrode, substantially the same effect as in Example 2 could be obtained also by using either Cr or Co in place of Mn as a transition metal and any of Li, K, Rb and Cs in place of Na as an alkali metal.

In this case, the proportion of the transition metal Cr or Co incorporated as a solid solution was preferably 8 to 20 atomic % based on the amount of the nickel hydroxide active material in terms of metallic nickel, and the proportion of the alkali metal Li, K, Rb or Cs incorporated as a solid solution, based on the amount of the nickel hydroxide active material in terms of metallic nickel was preferably as follows: Li 5 to 10 atomic %, K 6 to 10 atomic %, Rb 6 to 10 atomic %, or Cs 5 to 10 atomic %.

Further, substantially the same effect as above can be obtained not only by using a combination of a single transition metal and a single alkali metal as described above, as metals to be incorporated as a solid solution into the nickel hydroxide active material for the positive electrode, but also by using a combination of two or more transition metals (one of them being used as a main metal) selected from the group consisting of Mn, Cr and Co and a combination of two or more alkali metals selected from the group consisting of Li, Na, K, Rb and Cs, as metals to be incorporated as a solid solution into the nickel hydroxide active material for the positive electrode. When the two or more transition metals and the two or more alkali metals are used in combination, the total proportion of the transition metals incorporated and the total proportion of the alkali metals incorporated are preferably 8 to 20 atomic % and 5 to 10 atomic %, respectively, based on the amount of the nickel hydroxide in terms of metallic nickel.

Although an aqueous sodium hydroxide solution having a concentration of 10 mol/l was used above as the alkali electrolyte, the concentration is not limited to 10 mol/l and ranges preferably from 8 to 12 mol/l. Properties other than the concentration of the alkali electrolyte may be the same as in Example 1, and such an alkali electrolyte brings about substantially the same effect as in Example 1.

EXAMPLE 3

A nickel/metal hydride storage battery D was produced in the same manner as in Example 1 except that as an active material for positive electrode plate, there was used 100 parts by weight of a material obtained by incorporating Mn and Ca as a solid solution into nickel hydroxide powder of spherical particles with an average diameter of 15 $\mu$m in proportions of 18 atomic % and 8 atomic %, respectively, based on the amount of the nickel hydroxide in terms of metallic nickel.

For comparison, the same battery B as in Comparative Example was used.

For each of the batteries D and B, the utilization of the active material was determined in the same manner as in Example 1 and found to be 133% for the battery D and 100% for the battery B.

For confirmation, in the same manner as in Example 1, each of the batteries D and B in charged state was disassembled, and the positive electrode plate was taken out and then analyzed by X-ray diffraction. The angle of diffraction $2\theta$ was measured by the analysis. As a result, in the case of the positive electrode plate of the battery D, a diffraction peak of $2\theta$ on (00l) plane of $\beta$-NiOOH could be confirmed at an angle of near 17° and no peak due to $\gamma$-NiOOH could be confirmed. The diffraction peaks in the case of the positive electrode plate of the battery B were as described above.

In the case of the battery D, the following is conjectured: at charged state, the active material of the positive electrode assumed a state in which nickel had been highly oxidized, the nickel average valence was increased to about 3.5 though less than 3.5, the number of reaction electrons became larger than in the battery B, the energy density of the nickel hydroxide itself was increased, and hence the utilization of the active material of the positive electrode became 133% which was 33% higher than in the battery B.

Although in Example 3, there was used the material obtained by incorporating Mn and Ca as a solid solution into the nickel hydroxide active material for the positive electrode in proportions of 18 atomic % and 8 atomic %, respectively, based on the amount of the nickel hydroxide in terms of metallic nickel, substantially the same effect as above could be obtained so long as the proportions of Mn and Ca are 2 to 20 atomic % and 5 to 10 atomic %, respectively. Preferable ranges of the proportions of Mn and Ca were 5 to 20 atomic % and 5 to 10 atomic %, respectively.

In addition, although in Example 3, the transition metal Mn and the alkaline earth metal Ca were used as metals to be incorporated as a solid solution into the nickel hydroxide active material for the positive electrode, substantially the same effect as in Example 3 could be obtained also by using either Cr or Co in place of Mn as a transition metal and any of Mg, Sr and Ba in place of Ca as an alkaline earth metal. In this case, the proportion of the transition metal Cr or Co incorporated as a solid solution was preferably 2 to 10 atomic % based on the amount of the nickel hydroxide active material in terms of metallic nickel, and the proportion of the alkaline earth metal Mg, Sr or Ba incorporated as a solid solution, based on the amount of the nickel hydroxide active material in terms of metallic nickel was preferably as follows: Mg 5 to 10 atomic %, Sr 6 to 10 atomic %, or Ba 6 to 10 atomic %.

Further, substantially the same effect as in Example 3 can be obtained not only by using a combination of a single transition metal and a single alkaline earth metal as described above, as metals to be incorporated as a solid solution into the nickel hydroxide active material for the positive electrode, but also by using a combination of two or more transition metals (one of them being used as a main metal) and a combination of two or more alkaline earth metals, as metals to be incorporated as a solid solution into the nickel hydroxide active material for the positive electrode. When the two or more transition metals and the two or more alkaline earth metals are used in combination, the total proportion of the transition metals incorporated and the total proportion of the alkaline earth metals incorporated are preferably 2 to 20 atomic % and 5 to 10 atomic %, respectively, based on the amount of the nickel hydroxide in terms of metallic nickel.

Properties and handling of the alkali electrolyte may be the same as in Example 1. In this case, the same effect as in Example 1 can be obtained.

EXAMPLE 4

A nickel/metal hydride storage battery E was produced in the same manner as in Example 1 except that as an active material for positive electrode plate, there was used 100 parts by weight of a material obtained by incorporating three metals Mn, Na and Ca as a solid solution into nickel hydroxide powder of spherical particles with an average diameter of 15 $\mu$m in proportions of 18 atomic %, 6 atomic % and 4 atomic % (the total proportion of Na and Ca being 10 atomic %), respectively, based on the amount cf the nickel hydroxide in terms of metallic nickel.

For comparison, the same battery B as in Comparative Example was used.

For each of the batteries E and B, the utilization of the active material was determined in the same manner as in Example 1 and found to be 133% for the battery E and 100% for the battery B.

For confirmation, in the same manner as in Example 1, the battery E in charged state was disassembled, and the positive electrode plate was taken out and then analyzed by X-ray diffraction. The angle of diffraction $2\theta$ was measured by the analysis. As a result, in the case of the positive electrode plate of the battery E, a diffraction peak of $2\theta$ on (00l) plane of $\beta$-NiOOH could be confirmed at an angle of near 17° and no peak due to $\gamma$-NiOOH could be confirmed. The diffraction peaks in the case of the positive electrode plate of the battery B were as described above.

In the case of the battery E, the following is conjectured: at charged state, the active material of the positive electrode assumed a state in which nickel had been highly oxidized, the nickel average valence was increased to about 3.5 though less than 3.5, the number of reaction electrons became larger than in the battery B, the energy density of the nickel hydroxide itself was increased, and hence the utilization of the active material of the positive electrode became 133% which was 33% higher than in the battery B.

Although in Example 4, there was used the material obtained by incorporating Mn, Na and Ca as a solid solution into the nickel hydroxide active material for the positive electrode in proportions of 18 atomic %, 6 atomic % and 4 atomic %, respectively, based on the amount of the nickel hydroxide in terms of metallic nickel, substantially the same effect as above could be obtained so long as the proportions of Mn, Na and Ca are 2 to 20 atomic %, 2 to 6 atomic % and 2 to 6 atomic %, respectively, and the total proportion of Na and ca is 5 to 10 atomic %. A preferable range of the proportion of Mn was 5 to 20 atomic %. Although the proportion of each of Na and Ca was important, the control of the total proportion of Na and Ca was more important.

In addition, although in Example 4, the transition metal Mn, the alkali metal Na and the alkaline earth metal Ca were used as metals to be incorporated as a solid solution into the nickel hydroxide active material for the positive electrode, substantially the same effect as above could be obtained also by using either Cr or Co in place of Mn as a transition metal, any of Li, K, Rb and Cs in place of Na as an alkali metal, and any of Mg, Sr and Ba in place of Ca as an alkaline earth metal. In this case, the proportions of these metals incorporated as a solid solution, based on the amount of the nickel hydroxide active material in terms of metallic nickel were preferably as follows: the proportion of the transition metal Cr or Co was 8 to 20 atomic %, and both of the proportions of the alkali metal and the alkaline earth metal were 2 to 6 atomic % when a single metal was used as each of them, the total proportion of the alkali metal and the alkaline earth metal being 5 to 10 atomic %.

Further, substantially the same effect as in Example 4 can be obtained not only by using a combination of three metals, i.e., a single transition metal, a single alkali metal and a single alkaline earth metal as described above, as metals to be incorporated as a solid solution into the nickel hydroxide, but also by using a combination of four or more metals in all, for example, a combination of a transition metal Mn, two or more members selected from one of the families of the alkali metals and the alkaline earth metals, and one or more member selected from the other family, as metals to be incorporated as a solid solution into the nickel hydroxide. In the case of such simultaneous use, the proportion of the transition metal incorporated and the total proportion of the alkali metal(s) and the alkaline earth metal(s) incorporated should be 2 to 20 atomic % and 5 to 10 atomic %, respectively, based on the amount of the nickel hydroxide in terms of metallic nickel.

Properties and handling of the alkali electrolyte may be the same as in Example 1. In this case, the same effect as in Example 1 can be obtained.

As described above, in the battery of the present invention, nickel hydroxide as the main active material of the positive electrode should necessarily contain at least one transition metal selected from the group consisting of Mn, Cr and Co. At charged state, the crystal structure of the nickel hydroxide is a hexagonal or tetragonal system which has a diffraction peak of 2θ on (00l) plane of β-NiOOH at an angle of approximately 15°–19°, preferably 16°–19°, more preferably 16°–17°, and preferably no peak on (003) plane of γ-NiOOH at an angle of near 12°, in X-ray diffraction using CuKα as a source and has a regular array with a NaCl type structure. Therefore, at charged state, the nickel average valence is as high as about 3.5 though less than 3.5, the number of reaction electrons is increased, the energy density of the active material is increased, and characteristics of the positive electrode can be improved.

What is claimed is:

1. A nickel/metal hydride storage battery comprising:
   a positive electrode comprising an active material composed mainly of nickel hydroxide;
   a negative electrode composed mainly of a hydrogen-absorbing alloy, an alkali electrolyte and a separator,
   wherein the nickel hydroxide contains as a solid solution at least one transition metal selected from the group consisting of Mn, Cr and Co, in a proportion of 2 to 20 atomic % based on the amount of the nickel hydroxide in terms of metallic nickel, and the crystal structure of the nickel hydroxide at charged state is a hexagonal or tetragonal system which has a diffraction peak of 2θ on (00l) plane of β-NiOOH at an angle of approximately 15°–19° in X-ray diffraction using CuKα as a source and has a regular array with a NaCl type structure,
   wherein the alkali electrolyte comprises an aqueous sodium hydroxide solution having a concentration of 8 to 12 mol/l, and the nickel hydroxide contains Mn as a solid solution in a proportion of 8 to 20 atomic % based on the amount of the nickel hydroxide in terms of metallic nickel.

2. A nickel/metal hydride storage battery comprising a positive electrode made of an active material composed mainly of nickel hydroxide, a negative electrode composed mainly of a hydrogen-absorbing alloy, an alkali electrolyte and a separator, wherein the nickel hydroxide as the main active material of said positive electrode contains as a solid solution at least one transition metal selected from the group consisting of Mn, Cr and Co and at least one alkali metal selected from the group consisting of Li, Na, K, Rb and Cs, the proportion of the transition metal(s) being 2 to 20 atomic % based on the amount of the nickel hydroxide in terms of metallic nickel, and the proportion of the alkali metal(s) being 5 to 10 atomic % based on the amount of the nickel hydroxide in terms of metallic nickel, and the crystal structure of the nickel hydroxide at charged state is a hexagonal or tetragonal system which has a diffraction peak of 2θ on (00l) plane of β-NiOOH at an angle of approximately 15°–19° in X-ray diffraction using CuKα as a source and has a regular array with a NaCl type structure.

3. A nickel/metal hydride storage battery according to claim 2, wherein the nickel hydroxide as the main active material of the positive electrode contains Mn and Na as a solid solution in proportions of 5 to 20 atomic % and 5 to 10 atomic %, respectively, based on the amount of the nickel hydroxide in terms of metallic nickel.

4. A nickel/metal hydride storage battery according to claim 2, wherein the alkali electrolyte comprises an aqueous sodium hydroxide solution having a concentration of 8 to 12 mol/l, and the nickel hydroxide as the main active material of the positive electrode contains Mn and Na as a solid solution in proportions of 5 to 20 atomic % and 5 to 10 atomic %, respectively, based on the amount of the nickel hydroxide in terms of metallic nickel.

5. A nickel/metal hydride storage battery comprising a positive electrode made of an active material composed mainly of nickel hydroxide, a negative electrode composed mainly of a hydrogen-absorbing alloy, an alkali electrolyte and a separator, wherein the nickel hydroxide as the main active material of said positive electrode contains as a solid solution at least one transition metal selected from the group consisting of Mn, Cr and Co and at least one alkaline earth metal selected from the group consisting of Mg, Ca, Sr and Ba, the proportion of the transition metal(s) being 2 to 20 atomic % based on the amount of the nickel hydroxide in terms of metallic nickel, and the proportion of the alkaline earth metal(s) being 5 to 10 atomic % based on the amount of the nickel hydroxide in terms of metallic nickel, and the crystal structure of the nickel hydroxide at charged state is a hexagonal or tetragonal system which has a diffraction peak of 2θ on (00l) plane of β-NiOOH at an angle of approximately 15°–19° in X-ray diffraction using CuKα as a source and has a regular array with a NaCl type structure.

6. A nickel/metal hydride storage battery according to claim 5, wherein the nickel hydroxide as the main active material of said positive electrode contains at least one transition metal selected from the group consisting of Mn, Cr and Co and at least one alkaline earth metal selected from the group consisting of Mg, Ca, Sr and Ba, the proportion of the transition metal(s) being 2 to 20 atomic % based on the amount of the nickel hydroxide in terms of metallic nickel, and the proportion of the alkaline earth metal(s) being 5 to 10 atomic % based on the amount of the nickel hydroxide in terms of metallic nickel.

7. A nickel/metal hydride storage battery according to claim 5, wherein the nickel hydroxide as the main active material of the positive electrode contains Mn and Ca as a solid solution in proportions of 5 to 20 atomic % and 5 to 10 atomic %, respectively, based on the amount of the nickel hydroxide in terms of metallic nickel.

8. A nickel/metal hydride storage battery comprising a positive electrode made of an active material composed mainly of nickel hydroxide, a negative electrode composed mainly of a hydrogen-absorbing alloy, an alkali electrolyte and a separator, wherein the nickel hydroxide as the main active material of said positive electrode contains as a solid solution at least one transition metal selected from the group consisting of Mn, Cr and Co, at least one alkali metal selected from the group consisting of Li, Na, K, Rb and Cs, and at least one alkaline earth metal selected from the group consisting of Mg, Ca, Sr and Ba, the proportion of the transition metal(s) being 2 to 20 atomic % based on the amount of the nickel hydroxide in terms of metallic nickel, and the total proportion of the alkali metal(s) and the alkaline earth metal(s) being 5 to 10 atomic % based on the amount of the nickel hydroxide in terms of metallic nickel, and the crystal structure of the nickel hydroxide at charged state is a hexagonal or tetragonal system which has a diffraction peak of 2θ on (00l) plane of β-NiOOH at an angle of approximately 15°–19° in X-ray diffraction using CuKα as a source and has a regular array with a NaCl type structure.

9. A nickel/metal hydride storage battery according to claim 8, wherein the nickel hydroxide as the main active material of the positive electrode contains as a solid solution Mn in a proportion of 5 to 20 atomic % based on the amount of the nickel hydroxide in terms of metallic nickel, and Na and Ca in a total proportion of 5 to 10 atomic % based on the amount of the nickel hydroxide in terms of metallic nickel.

10. A nickel/metal hydride storage battery according to claim 8, wherein the alkali electrolyte comprises an aqueous sodium hydroxide solution having a concentration of 8 to 12 mol/l, and the nickel hydroxide as the main active material of said positive electrode contains as a solid solution Mn, Na and Ca in proportions of 5 to 20 atomic %, 2 to 6 atomic % and 2 to 6 atomic %, respectively, based on the amount of the nickel hydroxide in terms of metallic nickel, the total proportion of Na and Ca being 5 to 10 atomic % based on the amount of the nickel hydroxide in terms of metallic nickel.

* * * * *